United States Patent [19]

Göbel et al.

[11] Patent Number: 6,139,622
[45] Date of Patent: Oct. 31, 2000

[54] PROCESS FOR THE PRODUCTION OF INTEGRALLY WATERPROOFED CONCRETE

[75] Inventors: Thomas Göbel, Hanau; Wolfgang Lortz, Wächtersbach; Reiner Störger, Seligenstadt; Folker Wittmann, Unterengstringen; Andreas Gerdes, Zürich, all of Germany

[73] Assignee: Degussa-Huls AG, Frankfurt am Main, Germany

[21] Appl. No.: 09/182,522

[22] Filed: Oct. 30, 1998

[30] Foreign Application Priority Data

Oct. 30, 1997 [DE] Germany ............... 197 47 794

[51] Int. Cl.$^7$ ............... C04B 24/40; C09K 3/18
[52] U.S. Cl. ............... 106/806; 106/2; 106/724; 106/727; 106/823; 106/287.11; 106/287.13; 106/287.14; 106/287.5; 427/387
[58] Field of Search ............... 106/2, 724, 727, 106/806, 823, 287.11, 287.13, 287.14, 287.5; 427/387

[56] References Cited

U.S. PATENT DOCUMENTS

| | | | |
|---|---|---|---|
| 3,772,065 | 11/1973 | Seiler | 427/299 |
| 4,525,213 | 6/1985 | Linn | 106/2 |
| 4,982,017 | 1/1991 | Deberitz et al. | 568/834 |
| 5,458,923 | 10/1995 | Goebel et al. | 427/387 |
| 5,766,323 | 6/1998 | Butler et al. | 106/2 |
| 5,776,245 | 7/1998 | Thomas | 106/781 |

FOREIGN PATENT DOCUMENTS

| | | | |
|---|---|---|---|
| 234024 | 9/1987 | European Pat. Off. | |
| 0 340 819 B1 | 11/1989 | European Pat. Off. | |
| 0 538 555 A1 | 4/1993 | European Pat. Off. | |
| 92/06101 | 4/1992 | WIPO | 106/2 |

Primary Examiner—Anthony Green
Attorney, Agent, or Firm—Pillsbury Madison & Sutro LLP

[57] ABSTRACT

This invention relates to a process for the production of a homogeneously waterproofed concrete (integrally waterproofed concrete) in which an aqueous hydrolysable, emulsion containing organosilicon compounds is added before curing to the fresh concrete mix prepared from water, inorganic and optionally organic constituents, which emulsion contains at least one alkoxysilane and optionally an organosilicon compound acting as a surfactant.

14 Claims, No Drawings

PROCESS FOR THE PRODUCTION OF INTEGRALLY WATERPROOFED CONCRETE

FIELD OF THE INVENTION

This invention relates to a process for the production of at least largely homogeneously waterproofed concrete (integrally waterproofed concrete) by the incorporation of aqueous emulsions containing organosilicon compounds into uncured concrete mixes.

BACKGROUND OF THE INVENTION

Prior art impregnation processes are known in which such emulsions are brushed onto concrete components, thereby waterproofing the surface thereof (EP-B-0538 555, EP-B-0340816, EP-A-0234024).

Although good results, for example with regard to the depth of penetration of moisture, are achieved in this manner, the process is associated with problems. One such problem is that the user must apply the emulsions carefully to provide a continuous layer on the concrete surface. However, defects in the concrete are not discernible from the outside. Nonetheless, they constitute possible points of entry for destructive liquids such that protection of the surface is no longer ensured.

Moreover, ageing of the concrete surface by exposure to chemical, thermal and also mechanical stresses weakens the hydrophobic protective layer. This means that the layer must be renewed at regular intervals. However, a prerequisite for this renewal is that the surface to be treated must first be subjected to costly cleaning, for example using a high pressure water jet.

SUMMARY OF THE INVENTION

The object of the invention is accordingly to provide a process by means of which concrete components or concrete structures may effectively be protected from corrosion without requiring costly, repeated measures to ensure this protection.

Care must also be taken in this connection that incorporation of these protective chemical compounds does not degrade the workability of concrete mixes, for example with regard to viscosity and, with regard to those properties influencing strength such as for example porosity, these parameters are not impaired.

The present invention provides a process for the production of integrally waterproofed concrete, which process is characterised in that an aqueous emulsion containing hydrolysable organosilicon compounds is added during production or optionally thereafter to a mix containing water prepared from per se known inorganic and optionally small proportions of organic constituents and the mix is then allowed to cure to form the concrete. Emulsions of this type are known per se, but in the prior art are used only for waterproofing surfaces. Aqueous emulsions which are suitable for the use according to the invention may be found, for example, in the description of EP-A 0234 024, EP-B 0340 816 or EP-A-0616 989. The aqueous emulsions disclosed in these patent applications also constitute part of the present invention. These emulsions preferably contain hydrolysable alkylalkoxysilanes of the general formula (I) in a quantity of 1 to 70 wt. %, relative to the total quantity of the emulsion.

Further constituents are generally known nonionic or ionic emulsifiers, for example having an HLB value of 1.5 to 20, in particular stearates, oleates and optionally buffering substances. When using these emulsions, care should preferably be taken to ensure that the droplets of the organosilicon compounds in water have a diameter of 0.5 to 10 $\mu$m. In a particularly suitable case, the average particle size is 0.30 to 1.1 $\mu$m.

In one particular embodiment, the emulsion contains 1 to 80 wt. %, preferably 1 to 60 wt. %, of at least one alkylalkoxysilane of the general formula

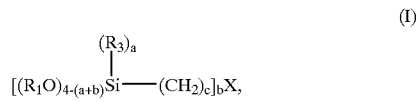

in which
R, $R_1$ are $C_1$–$C_3$ alkyl, optionally branched,
$R_3$ is $C_1$–$C_{20}$ alkyl, linear or branched, in particular $C_1$–$C_{10}$ alkyl, phenyl,
a is 0 or 1,
b is 1 or 2,
c is 1 to 18,
X is H, Cl, Br, I, $NH_2$, SCN, CN, $N_3$, NHR, $N(R)_2$, $N(R)_3$ or aryl, preferably H, Cl, $NH_2$, SCN, NHR, $N(R_2)$, $N(R_3)$, with the meaning of R as above, phenyl, if b=1.
or X is alkenyl, in particular —$CH_2$—, ethylene, trimethylene or tetramethylene, if b=2.
or X is $S_x$ where x=1 to 6 if b=2 and c=1 to 6,
or X is without meaning, if b=2 and c=1 to 12, preferably 1 to 6.

Instead of or in addition to one of the known surfactants, in particular 1 to 20 wt. %, preferably 1 to 5 wt. % of an organosilicon compound of the general formula:

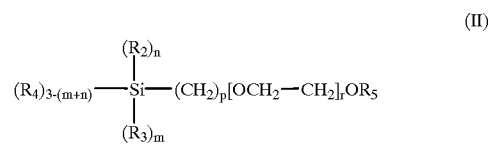

in which
$R_2$, $R_3$ are identical or different and are $C_1$–$C_{20}$ alkyl, linear or branched, preferably $C_1$–$C_{10}$ alkyl, or phenyl
$R_4$ is $C_1$–$C_3$ alkoxy, $[OCH_2—CH_2]_r$ $OR_5$,

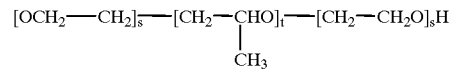

where s=3–50, t=3–25
$R_5$ is H, $C_1$–$C_{20}$ alkyl, $C_2$–$C_{36}$ alkenyl, $C_5$–$C_8$ cycloalkyl, $C_7$–$C_{36}$ aralkyl, if p=o and r=0 corresponds to $OR_5$: —$[OCH_2—CH_2]_s$—$[CH_2—CHO]_t$—$[CH_2—CH_2O]_sH$
m is 0, 1, 2;
n is 0, 1, 2 providing that (m+n)=1 or 2, if p=0, where p≠0 (m+n)=0, 1 or 2 applies,
p is 0, 1, 2, 3,
r is an integer between 0 and 50,
and water in a quantity from 1 to 95 wt. %, preferably from 1 to 75 wt. %, wherein the quantities by weight add up to 100%, and the mix is then allowed to cure to form the concrete.

Preferably, n-octyltriethoxysilane and hexadecyltriethoxy-silane are used as compound (I).

In addition to the compounds of the formula (I), the emulsions may also contain the partial condensation products thereof, for example dimers, trimers or other oligomers thereof, as are generally known to the person skilled in the art. The pH value of the emulsion is preferably adjusted to approximately 7.5. In a particular embodiment, a buffer substance is added to the emulsion in a quantity of 0.1 to 5 wt. %, relative to the total quantity of the emulsion. The buffer substance is, for example, sodium hydrogen carbonate, sodium carbonate or trisodium phosphate.

In a preferred embodiment, 0.2 to 8.0 wt. %, relative to the total weight of the emulsion, of one or more known anionic surfactants are also added to the emulsion. The disperse phase advantageously has an average particle or droplet diameter of 0.30 to 1.1 μm, and a width of the particle size distribution of ≦1.3.

The emulsion according to the invention optionally also contains 0.1 to 1.0 wt. % of a known thickener, for example from the class of cellulose or starch derivatives, likewise relative to the total quantity of the emulsion.

In one specific embodiment of the invention, silicon-functional surfactants of the following general formulae (VII) and (VIII) are used.

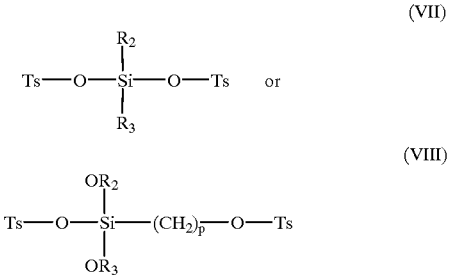

in which $R_2$, $R_3$ and p have the meaning as above and Ts corresponds to:

$(CH_2CH_2O)_n$—$R_5$ n=3–15,

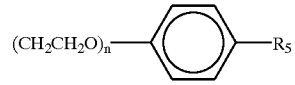

n = 3–15,

—$(CH_2CH_2O)_{\overline{n}}$—$(CH_2$—$CHO)_m(CH_2CH_2O)_nH$
                                    |
                                    $CH_3$ m = 3–50
n = 3–25

Where $R_5$ has the same meaning as above.

In a preferred embodiment, in particular also in the case of emulsions containing short-chain silanes, for example containing $C_3$ and $C_4$ alkylene groups, an acidic catalyst is added shortly before use which is capable of breaking the Si—O bonds, but not the Si—C bonds, in the claimed alkoxysilanes, in order to improve the effectiveness of the silanes on neutral, weakly acidic or alkaline, in particular problematic, surfaces.

A homogeneous distribution of the emulsion used according to the invention in the concrete mix has, of course, proved to be most successful. However, ideal conditions cannot always be assumed under real conditions of use on construction sites.

It has, however, been found that the advantages of the waterproofed concrete produced according to the invention are achieved even in the event of largely homogeneous mixing of the concrete constituents with the organosilicon compounds according to the invention.

The emulsions used according to the invention are advantageously added to the finely divided inorganic and optionally organic constituents of the concrete mix together with the water necessary for the production of this mix.

The concentration of the emulsions amounts to 0.1 to 10 wt. %, preferably 0.5 to 7 wt. %, relative to the cement present in the concrete mix.

It has been found that the use according to the invention of the emulsions containing organosilicon compounds does not merely waterproof the concrete throughout its mass, ideally homogeneously. Even during working of the fresh concrete mix, advantages are achieved relating to better flow behaviour in comparison with a standard mix without organosilicon compounds.

The liquefying action of the emulsions may in certain cases be used to reduce the water content in the concrete mix to be produced, which has an additional advantageous effect on the development of strength and density.

In one important use, the concrete mixes produced according to the invention are applied in the form of shotcrete onto load-bearing members, in particular made from concrete.

Destructive salts do not penetrate though this protective layer into the structural concrete.

The structural concrete may optimally be tailored to its supporting function since the protective function is assumed by the surfacing layer.

Subsequent application of this surfacing layer may, however, also be of significance, if, for example due to a change in use, a structure is subjected to an unforeseen exposure to a destructive substance.

There are also important applications which demand waterproofing through the mass of the concrete components.

Such applications include, for example, bridge decks, tunnel entrances and exits or waste water pipes.

Once cured, the concrete mixes produced according to the invention exhibit distinctly lower water absorption coefficients and considerably greater resistance to chloride penetration than untreated concrete.

Unlike improvements achieved by external treatment, these properties are durable as they are not determined by wear phenomena at the surface.

Integral waterproofing, as described in this document, has not hitherto been considered by the person skilled in the art because, according to the prior art, the organosilicon compounds used would have been expected to be hydrolysed or condensed due to the strongly alkaline conditions in the concrete mix so greatly impairing the effectiveness of the waterproofing compounds.

Applications are also conceivable in which the hydrophobic characteristics of the concrete produced according to the invention are strengthened by a prior art (DE-PS 2751714, U.S. Pat. No. 4,661,551) external treatment with organosilicon compounds or the emulsions described. The disclosures of these cited patent applications are incorporated therein by reference.

This application is based on German priority application DE 197 47 794.1, filed Oct. 30, 1997, which entire disclosure is incorporated herein by reference.

DETAILED DESCRIPTION OF THE PREFERRED EMBODIMENTS

EXAMPLES

1. Compounds Used

Silane type A: octyltriethoxysilane (50 wt. % of the emulsion), and silane surfactant according to the formula (II) (EP-B-0538555) (1 wt. % of the emulsion)

Silane type B: hexadecyltriethoxysilane (50 wt. % of the emulsion), and silane surfactant according to the formula (II) (EP-B-0538555) (1 wt. % of the emulsion)

2. Testing of the concrete articles was performed in accordance with the methods specified by the Swiss association of engineers and architects: SIA 162 (1993) SIA 162/1 (1989, concrete structures: materials testing).

3. Composition of the Concrete Mix

TABLE 1

| | |
|---|---|
| Sand, 0–4 mm [kg/m$^3$] | 829 |
| Aggregate, 4–8 mm [kg/m$^3$] | 368 |
| Aggregate, 8–16 mm [kg/m$^3$] | 645 |
| Portland cement, CEM I 42.5 [kg/m$^3$] | 350 |
| Water [kg/m$^3$] | 175 |
| Silane emulsion (active content 51%) | 10.5 |

4. Properties of Fresh Concrete

TABLE 2

| Test no. | | Slump [cm] | Air content [%] | Density [kg/dm$^3$] |
|---|---|---|---|---|
| 1 | Silane emulsion, type A | 39.5 | 2.80 | 2373 |
| 2 | Silane emulsion, type B | 41.5 | 3.0 | 2375 |
| 3 | Standard concrete | 36 | 3.2 | 2383 |

Slump, which characterises flow properties, shows that concrete mixes 1 and 2 produced according to the invention flow better and are thus more readily workable than the standard mix without silane emulsion. The mixes according to the invention also exhibit a lower air content, such that the concrete produced therefrom is less porous.

5. Resistance to Chloride Penetration

Resistance to chloride penetration is tested with a 3% NaCl solution. To this end, four sides of a concrete cube are coated with epoxy resin.

An uncoated side of this cube is then immersed for 24 hours in the salt solution and capillary liquid absorption measured.

The test cubes are then dried for 24 hours at 50° C.

This sequence is performed repeatedly until a virtually constant value is achieved. After 15 days, the untreated concrete article exhibited absorption of approx. 9 kg/m$^2$, while the impregnated concrete had absorbed only approx. 1 kg/m$^2$.

6. Water Absorption Coefficient of Concrete

TABLE 3

| Test no. | | Water absorption coefficient [kg/m$^2$h$^{0.5}$] |
|---|---|---|
| 1 | Silane emulsion, type A | 0.084 |
| 2 | Silane emulsion, type B | 0.112 |

TABLE 3-continued

| Test no. | | Water absorption coefficient [kg/m$^2$h$^{0.5}$] |
|---|---|---|
| 3 | Standard concrete | 1.31 |

The water absorption coefficient of the concrete article produced according to the invention is distinctly lower than that of the standard mix.

What is claimed is:

1. A process for the production of integrally waterproofed concrete, comprising the steps of:

providing a concrete mix containing cement and water, adding to the water, during or after preparation of said concrete mix, 0.5 to 7% by weight relative to the cement of an emulsion containing an aqueous alkoxysilane compound of the general formula

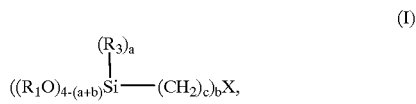

(I)

and, optionally, partial condensation products thereof, wherein:

R and $R_1$ are optionally branched $C_1$–$C_3$ alkyl;

$R_3$ is a linear or branched $C_1$–$C_{20}$ alkyl, or phenyl;

a is 0 or 1;

b is 1 or 2;

c is 1 to 18;

X is H, Cl, Br, I, $NH_2$, SCN, CN, $N_3$, NHR, $N(R)_2$, $N(R)_3$ or aryl, where b=1;

or X is alkenyl, where b=2;

or X is $S_x$, where x=1 to 6, where b=2 and c=1 to 6;

or X is a single bond, where b=2 and c=1 to 12; and allowing the concrete mix to cure to form said integrally waterproofed concrete.

2. A process according to claim 1, wherein the emulsion contains hydrolysable organosilicon compounds and ionic or nonionic surfactants or emulsifiers.

3. A process according to claim 1, wherein a disperse phase of the emulsion has an average particle diameter of 0.3 to 1.1 μm and a width of particle size distribution of ≦1.3.

4. A process according to claim 1, wherein the emulsion contains:

(i) from 1 to 80 wt. % of said aqueous alkoxysilane compound of the general formula

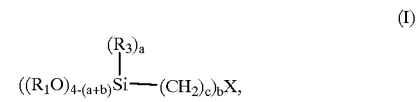

(I)

and optionally partial condensation products thereof; and (ii) an organosilicon compound of the general formula

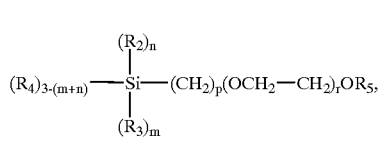
(II)

wherein:
$R_2$ and $R_3$ are identical or different, linear or branched $C_1$–$C_{20}$ alkyl, or phenyl,
$R_4$ is $C_1$–$C_3$ alkoxy,

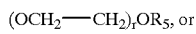

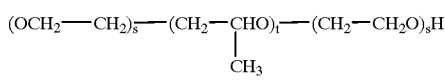

wherein
s=3 to 50 and
t=3 to 25;
$R_5$ is H, $C_1$–$C_{20}$ alkyl, $C_2$–$C_{36}$ alkenyl, $C_5$–$C_8$ cycloalkyl, $C_7$–$C_{36}$ aralkyl or

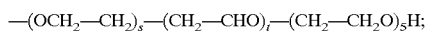

m is 0, 1 or 2;
n is 0, 1 or 2 provided that (m+n)=1 or 2, where p=0; and where p≠0, (m+n)=0, 1 or 2;
p is 0, 1, 2 or 3;
r is an integer from 0 to 50; and
(iii) water in a quantity from 1 to 95 wt. %;
wherein the sum of the wt. % of said alkoxysilane, organosilicon compound and water equals 100 wt. %.

5. A process according to claim 4, wherein the emulsion contains from 1 to 60 wt. % of the at least one aqueous alkoxysilane of the general formula (I).

6. A process according to claim 4, wherein the emulsion contains 1 to 5 wt. % of the organosilicon compound of the general formula (II).

7. A process according to claim 4, wherein the emulsion contains silicon-functional surfactants of the general formula

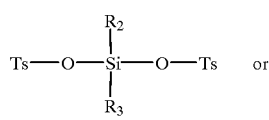
(VII)

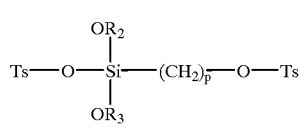
(VIII)

wherein $R_2$, $R_3$ and p have the meaning defined above and Ts corresponds to:

$(CH_2CH_2O)_n$—$R_5$, wherein n=3 to 15;

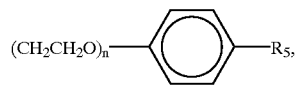

wherein n = 3 to 15; or

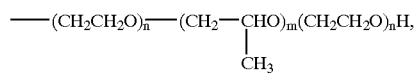

wherein m = 3 to 50 and n=3 to 25.

8. A process according to claim 2, wherein the emulsion contains, relative to the total weight of the emulsion, 0.2 to 8.0 wt. %, of one or more anionic surfactants.

9. A process according to claim 4, comprising adding an acidic catalyst to the emulsion before adding the emulsion to the concrete mix.

10. A process according to claim 1, comprising adding the emulsion to the concrete mix together with the water.

11. A process according to claim 1, comprising:
producing the concrete mix containing the emulsion containing the aqueous alkoxysilane compound;
working the mix;
allowing the mix to cure to form concrete; and
treating a surface of the concrete with said emulsion in a waterproofing treatment.

12. A concrete mix which comprises cement and water, wherein the water contains 0.5 to 7% of an emulsion containing an aqueous alkoxysilane compound of the general formula

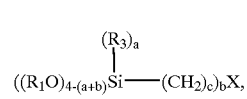
(I)

and, optionally, partial condensation products thereof, wherein:
R and $R_1$ are optionally branched $C_1$–$C_3$ alkyl;
$R_3$ is a linear or branched $C_1$–$C_{20}$ alkyl, or phenyl;
a is 0 or 1;
b is 1 or 2;
c is 1 to 18;
X is H, Cl, Br, I, $NH_2$, SCN, CN, $N_3$, NHR, $N(R)_2$, $N(R)_3$ or aryl, where b=1;
or X is alkenyl, where b=2;
or X is $S_x$, where x=1 to 6, where b=2 and c=1 to 6;
or X is a single bond, where b=2 and c=1 to 12.

13. A process for using a concrete mix comprising:
forming and curing a concrete mix according to claim 12, to produce surfacing layers in which the concrete mix is used as shotcrete.

14. A process for using a concrete mix comprising:
forming and curing a concrete mix according to claim 12, to produce structural components.

* * * * *